W. C. VAN DRESSER.
PIVOT CONSTRUCTION.
APPLICATION FILED SEPT. 4, 1915.
1,216,520.
Patented Feb. 20, 1917.
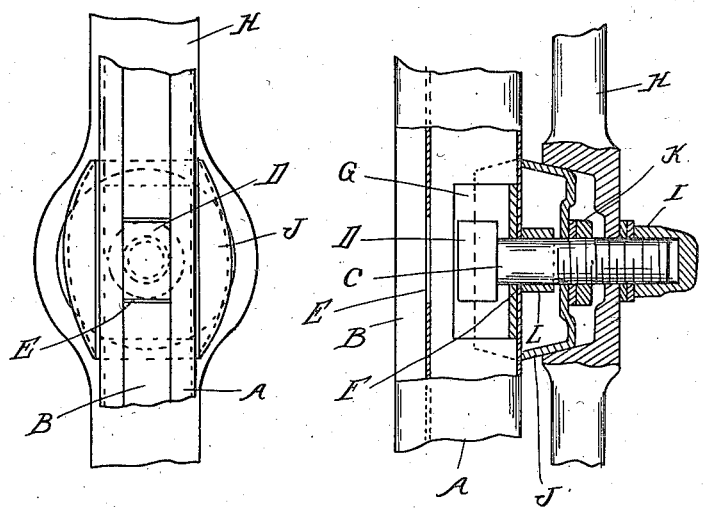
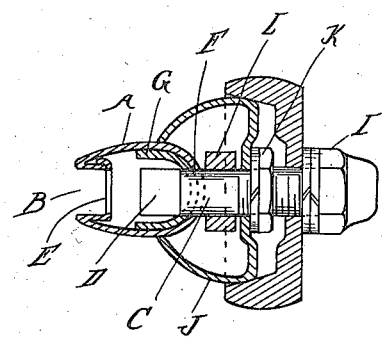
Inventor
William C. Van Dresser
By Whittemore Hulbert & Whittemore
Attorneys

UNITED STATES PATENT OFFICE.

WILLIAM C. VAN DRESSER, OF DETROIT, MICHIGAN, ASSIGNOR TO RANDS MANUFACTURING COMPANY, OF DETROIT, MICHIGAN, A CORPORATION OF MICHIGAN.

PIVOT CONSTRUCTION.

1,216,520.  Specification of Letters Patent.  Patented Feb. 20, 1917.

Application filed September 4, 1915. Serial No. 48,940.

*To all whom it may concern:*

Be it known that I, WILLIAM C. VAN DRESSER, a citizen of the United States of America, residing at Detroit, in the county of Wayne and State of Michigan, have invented certain new and useful Improvements in Pivot Constructions, of which the following is a specification, reference being had therein to the accompanying drawings.

The invention relates to pivot constructions more particularly designed for use in connection with windshields, and it is the object of the invention to obtain a construction which can be readily assembled, and in which the turning of the bolt by the clamping nut is prevented.

In the drawing:

Figure 1 is a central section through the pivot assembly as applied to a windshield;

Fig. 2 is a cross section; and

Fig. 3 is an elevation of the tubing showing the entrance slot for the pivot.

In the present state of the art it is usual to form windshield frames of channel tubing. The pivots for the frames are secured in various ways, one method being the insertion in the tubing of a filler block having a threaded aperture therein for engagement with a threaded portion of the pin or stud. The clamping nut is also engaged with a threaded portion of the pin, and one difficulty that has been experienced is the unscrewing of the pin from its socket, due to the friction of the clamping bolt. With the present invention the construction is simplified by dispensing with the threaded filler block and providing a headed pin insertible through an entrance slot in the tubing and held from rotation therein.

In detail, A is the tubing forming the windshield frame having the channel portion B for receiving the glass. C is the pivot pin, which is provided at its inner end with an elongated head D. The pin is engageable with the tube through the channel portion thereof, which is provided with an entrance slot E of sufficient size for the passage of the head D. There is also a smaller aperture F in the opposite side of the tube for the passage of the pin. To reinforce the construction a channeled reinforcement member G is inserted through the end of the tube, said member having an aperture registering with the aperture F, and the channel forming a seat for the head D.

The pivot C engages a suitable standard H and is clamped thereto by a nut I engaging the threaded end of the pin. As shown, the bearing portion of the pivot is formed by a sheet metal stamping J, which is fashioned to seat upon the tube A, and has a conical portion for engaging a corresponding conical recess in the standard H. This sheet metal member J may be secured by a clamping nut K engaging a threaded portion of the pin, and a sleeve L upon the pin inside of the member J forms a shoulder or abutment for the latter.

With the construction as described, the parts may be readily assembled by placing the reinforcement G and the member J in registration with the aperture F, and then inserting the pin C through the entrance slot E and registering apertures. The elongated head engaging the reinforcement G holds the pin from rotation, and thus the nut I may be tightened or loosened without danger of displacing other parts.

What I claim as my invention is:—

1. In a pivot construction, the combination with two relatively adjustable members, one of which is tubular, of a headed pivot pin having its head resting within said tubular member and having its shank engaged with the other member, an aperture being formed in the tubular member opposite the head to permit the introduction of the same thereinto.

2. The combination with a frame formed of channel tubing, of a pin having a head at its inner end insertible through an entrance slot in the channel portion of the tubing, said pin projecting outward through an aperture in the opposite side of the tubing.

3. The combination of a frame formed of channel tubing provided with an elongated entrance slot in the channel portion thereof and an aperture on the opposite side of the tube, and a pin having a head at its inner end insertible through said entrance slot, said pin projecting outward through the aperture in the opposite side of said tube and being retained from rotation by said head.

4. The combination with a tubular frame having an aperture on one side thereof and an elongated entrance slot upon the opposite side, of a headed pin insertible through said entrance slot and projecting outward through the aperture in the opposite side of the tube, and a reinforcement for said tube within the same and embracing the head of said pin.

5. The combination with a tubular frame having an aperture on one side thereof and an elongated entrance slot upon the opposite side, of a segmental reinforcement insertible within said tube and apertured for registration with said first-mentioned aperture, and a pin having a head insertible through said entrance slot, said pin projecting outward through said registering apertures and the head portion thereof being embraced by said segmental reinforcement.

6. The combination with a tubular frame having apertures on opposite sides thereof, one of said apertures being enlarged, of a headed pin insertible through said enlarged aperture and projecting outward through the opposite aperture, a sheet metal bearing member sleeved upon said pin and embracing said tube, and a clamping nut engaging a threaded portion of said pin for securing said sheet metal member.

7. The combination with a tubular frame having apertures on opposite sides thereof, one aperture being enlarged, of a headed pin insertible through said apertures, the head entering through said enlarged aperture, a sleeve upon the outwardly-projecting portion of said pin, a sheet metal member apertured to engage said pin and fashioned to embrace said tubing, and a clamping nut engaging a threaded portion of said pin and securing said sheet metal member against the abutment formed by said sleeve.

8. The combination of a headed pivot pin and a tubular frame having an entrance slot for said head and an aperture in the opposite side of the tubing for the outward projection of the pin, said pin being retained from rotation by the engagement of the head in said frame.

9. The combination with a tubular frame, of a pivot pin engaged therewith and projecting therefrom, a sleeve upon the projecting portion of said pin, a sheet metal member apertured to engage said pin and fashioned to embrace said tubing, and a clamping nut engaging the threaded portion of said pin and securing said sheet metal member against the abutment formed by said sleeve.

In testimony whereof I affix my signature in presence of two witnesses.

WILLIAM C. VAN DRESSER.

Witnesses:
A. KENDALL,
L. H. CLEMETT.